(12) United States Patent
Lin

(10) Patent No.: US 9,950,762 B2
(45) Date of Patent: Apr. 24, 2018

(54) ELECTRO-MECHANICAL GYRO-BALANCED UNICYCLE

(71) Applicant: Honggui Lin, Guangzhou (CN)

(72) Inventor: Honggui Lin, Guangzhou (CN)

( * ) Notice: Subject to any disclaimer, the term of this patent is extended or adjusted under 35 U.S.C. 154(b) by 0 days.

(21) Appl. No.: 15/211,648

(22) Filed: Jul. 15, 2016

(65) Prior Publication Data

US 2017/0334501 A1   Nov. 23, 2017

(30) Foreign Application Priority Data

May 17, 2016 (CN) .......................... 2016 1 0327374

(51) Int. Cl.
*B62K 1/00* (2006.01)
*B62K 11/00* (2006.01)
*B62M 7/12* (2006.01)

(52) U.S. Cl.
CPC .............. *B62K 1/00* (2013.01); *B62K 11/007* (2016.11); *B62M 7/12* (2013.01)

(58) Field of Classification Search
CPC ........... B62K 1/00; B62K 11/007; B62M 7/12
See application file for complete search history.

(56) References Cited

U.S. PATENT DOCUMENTS

| | | | | |
|---|---|---|---|---|
| 3,399,742 | A * | 9/1968 | Malick ...................... | B60T 1/06 180/21 |
| 4,109,741 | A * | 8/1978 | Gabriel ..................... | B62K 1/00 180/21 |
| 8,162,092 | B2 * | 4/2012 | Takenaka ................. | B60B 19/003 180/221 |
| 8,220,571 | B2 * | 7/2012 | Gomi ........................ | B62K 1/00 180/21 |
| 8,225,891 | B2 * | 7/2012 | Takenaka .............. | B62K 11/007 180/7.1 |
| 8,353,378 | B2 * | 1/2013 | Gomi ..................... | B60B 19/003 180/21 |
| 8,616,313 | B2 * | 12/2013 | Simeray .................. | B62K 1/00 180/181 |
| 8,807,250 | B2 * | 8/2014 | Chen ....................... | B62K 1/00 180/21 |
| 9,211,932 | B1 * | 12/2015 | Huennekens .......... | B62K 13/06 |
| 9,481,423 | B2 * | 11/2016 | Chen ....................... | B62K 1/00 |
| 2016/0185412 | A1 * | 6/2016 | Zuo ......................... | B62K 3/007 180/218 |
| 2016/0325801 | A1 * | 11/2016 | Artemev ............... | B62K 11/007 |
| 2017/0008593 | A1 * | 1/2017 | Artemev ............... | B60L 11/005 |

FOREIGN PATENT DOCUMENTS

| | | | |
|---|---|---|---|
| JP | 2011063243 A | * | 3/2011 |
| JP | 2012224260 A | * | 11/2012 |

* cited by examiner

*Primary Examiner* — Laura Freedman
(74) *Attorney, Agent, or Firm* — Knobbe, Martens, Olson & Bear, LLP

(57) ABSTRACT

An electro-mechanical gyro-balanced unicycle includes a wheel provided with a first motor, a housing provided outside the wheel and hollow pedals respectively provided at both sides of the housing. The pedal is provided with an electro-mechanical gyro assembly, and the electro-mechanical gyro assembly includes a second motor and a rotor capable of being driven by the second motor to rotate at a high speed so as to produce torques in a horizontal plane. The unicycle has a simple structure, can enable a beginner to be capable of quickly getting on the unicycle without any external assistant force, and can still well realize self-balance in left and right directions over time.

10 Claims, 3 Drawing Sheets

ELECTRO-MECHANICAL GYRO-BALANCED UNICYCLE

CROSS-REFERENCE TO RELATED APPLICATION

This application claims priority to Chinese Patent Application No. 201610327374.3 filed on May 17, 2016, the disclosure of which including the specification, the drawings, and the claims is hereby incorporated by reference in its entirety.

TECHNICAL FIELD

The present invention relates to the technical field of electric unicycles, and particularly to an electro-mechanical gyro-balanced unicycle.

BACKGROUND ART

An electric unicycle is a means of transport driven by electric power and controlled by a self-balancing capacity. In the rapid development of society today, traffic jams have become common phenomena in many large and medium-sized cities. A fashionable and convenient electric unicycle makes people enjoy the lighter moments of shuttling in the downtown and a quick and convenient commute. The electric unicycle is a new generation of energy-saving, environmentally-friendly and portable means of transport. When being charged for 3 to 4 hours, the electric unicycle can travel 15 to 30 kilometers, quite convenient for a short travel, and it can replace bus and subway. The electric unicycle, having a small and exquisite body and being convenient to carry, can be directly put into a trunk of a car, to be carried to home or office. In the context of increasingly serious environmental pollution, the electric unicycle, as a new type of environmentally-friendly means of transport, promotes the life concept of green travel and low-carbon environmental protection.

Most of the existing electric unicycles are stabilized at front and back through a gyroscope (the gyroscope refers to an angular motion detection device wherein an angular momentum sensitive housing of a high-speed revolving body rotates on one or two axes orthogonal to its own rotation axis, relative to an inertia space), but cannot realize balance in left and right directions, and during the operation process, left and right balance is maintained only by controlling the body, which is not very easy to control for a beginner. In order to address the problem of balance in the left and right directions, such an electric unicycle appears in the market: it comprises a wheel, a stander and pedals provided at both left and right sides of a lower end of the stander, wherein the stander is further provided therein with a flywheel, a first motor, a second motor, a first gyroscope, a second gyroscope, a first accelerometer, a second accelerometer and a controller, which are located right above the wheel, wherein the first motor drives the wheel to rotate, the second motor drives the flywheel to rotate, the first gyroscope and the first accelerator are provided at a left side of the flywheel, the second gyroscope and the second accelerator are provided at a right side of the flywheel, all of the first gyroscope, the second gyroscope, the first accelerator and the second accelerator are used to measure an angle of the flywheel, and then the controller controls the flywheel to rotate according to the detected angle to realize left and right balance.

Although the above-mentioned electric unicycle can realize left and right balance to a certain extent, there are still the following defects: firstly, this type of unicycle has a complicated structure, and needs many gyroscopes and accelerators to be provided, increasing the operation load of the controller, and in order to be capable of accurately calculating and controlling the operation of the wheel and the flywheel, relatively higher requirements have to be put on performances of the controller, while the better the performances of the controller are, the higher the price is, therefore the cost of the product is invisibly increased. What's more important is that this type of unicycle controls the left and right balance through the flywheel provided right above the wheel, with the precondition that a gravity center of the flywheel and a gravity center of the wheel should be kept on the same straight line, so that better control can be realized. But in the process of practical use, the product structure will be loosed over time, and it is completely impossible to always keep the flywheel right above the wheel. Therefore, the left and right balancing function of the unicycle will gradually decrease as the using time is continuously increased.

DISCLOSURE OF THE INVENTION

An object of the present invention is to provide an electro-mechanical gyro-balanced unicycle, which has a simple structure, can enable a beginner to be capable of quickly getting on the unicycle without any external assistant force, and can still well realize self-balance in left and right directions over time.

In order to realize the above-mentioned object, the present invention specifically uses the following technical solutions:

an electro-mechanical gyro-balanced unicycle, comprising a wheel provided therein with a first motor, a housing provided outside the wheel and hollow pedals respectively provided at both sides of the housing, wherein the pedal is provided therein with an electro-mechanical gyro assembly, and the electro-mechanical gyro assembly comprises a second motor and a rotor capable of being driven by the second motor to rotate at a high speed so as to produce torques in a horizontal plane.

In a relatively preferable example of the present invention, the above-mentioned rotor is a disk-shape metal component, and the second motor is internally embedded at an axle center of the rotor.

In a relatively preferable example of the present invention, the above-mentioned housing comprises two symmetrically provided housing halves, and the wheel is received in a first cavity defined by the two housing halves.

In a relatively preferable example of the present invention, the above-mentioned housing half comprises a main housing and a cover plate provided at one side of the main housing away from the wheel, and a battery pack and a control panel are provided in a second cavity defined by the main housing and the cover plate.

In a relatively preferable example of the present invention, the two above-mentioned main housings are respectively provided at respective top portions with through holes corresponding to each other.

In a relatively preferable example of the present invention, a leg protective pad is provided on an outer surface of the above-mentioned cover plate.

In a relatively preferable example of the present invention, the above-mentioned electro-mechanical gyro-balanced unicycle further comprises a brake light, a charging interface, a switch, a USB interface and an illumination lamp successively provided between the two main housings along a circumference of the housing.

In a relatively preferable example of the present invention, the above-mentioned electro-mechanical gyro-balanced unicycle further comprises a pull rod, and the pull rod is connected with the housing.

In a relatively preferable example of the present invention, the above-mentioned wheel further comprises a support shaft provided at an axle center of the first motor, and the support shaft extends and protrudes from a surface of the first motor toward both sides of the wheel.

In a relatively preferable example of the present invention, both ends of the above-mentioned support shaft are respectively provided with an L-shape connector, and the L-shape connector connects and fixes the housing and the pedals to both ends of the support shaft.

The beneficial technical effects of the present invention are as follows:

The electro-mechanical gyro-balanced unicycle of the present invention realizes omnidirectional self-balance of the unicycle in front, back, left and right directions during the operation process through the electro-mechanical gyro assemblies provided in the hollow pedals. The gyro assembly of the present invention comprises the second motor and the rotor capable of being driven by the second motor to rotate at a high speed so as to produce torques in the horizontal plane, and due to the gyro effect, the rotor produces torques along various directions, including front, back, left and right directions of the unicycle in the horizontal plane where it is located during the process of high-speed rotation, so as to maintain balance of the vehicle body of the unicycle in the front, back, left and right directions. The balance in the left and right directions of the unicycle of the present invention does not need to be adjusted by the user by controlling the gravity of his/her body, and the user just needs to adjust the moving direction and the moving speed of the vehicle body by controlling the gravity center of the body, moreover, the electro-mechanical gyro-balanced unicycle of the present invention has a simple structure and is easy to control.

BRIEF DESCRIPTION OF DRAWINGS

In order to more clearly illustrate technical solutions of examples of the present invention, figures which are needed for description of the examples will be introduced briefly below. It should be understood that the figures below merely show some examples of the present invention, and therefore should not be considered as limiting the scope. A person ordinarily skilled in the art still can obtain other relevant figures according to these figures, without paying inventive effort.

Figure 1:
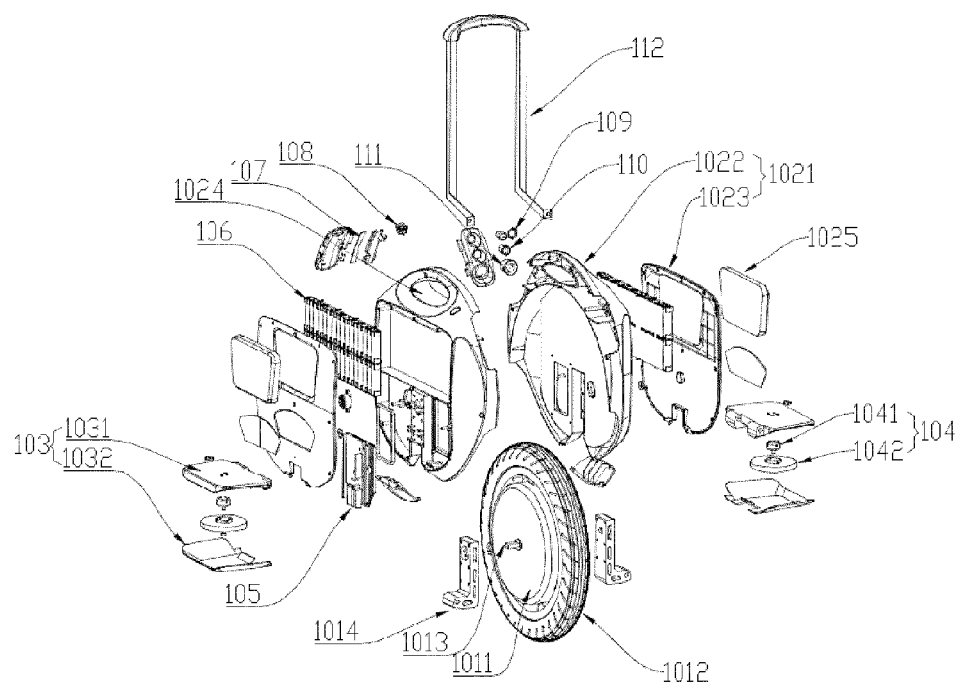
FIG. 1 is a structural explosive view of an electro-mechanical gyro-balanced unicycle of the present invention.

LIST OF REFERENCE SIGNS electro-mechanical gyro-balanced unicycle 100;
wheel 101; housing 102; pedal 103; electro-mechanical gyro assembly 104; control panel 105; battery pack 106; brake light 107; charging interface 108; switch 109; USB interface 110; illumination lamp 111; pull rod 112;
first motor 1011; inflated tire 1012; support shaft 1013; L-shape connector 1014;
housing half 1021; main housing 1022; cover plate 1023; through hole 1024; leg protective pad 1025;
gyro upper bracket 1031; gyro lower bracket 1032;
second motor 1041; rotor 1042.

DETAILED DESCRIPTION OF EMBODIMENTS

In order to make the objects, the technical solutions and the advantages of the examples of the present invention clearer, below the technical solutions of the examples of the present invention will be described clearly and completely in conjunction with figures in the examples of the present invention. Apparently, the described examples are some but not all examples of the present invention. Generally, assemblies in the examples of the present invention described and shown in the figures herein can be arranged and designed in various different configurations.

Therefore, the detailed description below of the examples of the present invention provided in the figures is not intended to limit the protection scope of the present invention, but merely represents chosen examples of the present invention. All other examples, obtained based on the examples of the present invention by a person ordinarily skilled in the art without paying inventive effort, fall within the scope of protection of the present invention.

In the description of the present invention, it should be noted that orientational or positional relationships indicated by terms such as "center", "upper", "lower", "left", "right", "vertical", "horizontal", "inner", and "outer" and so on are based on orientational or positional relationships as shown in the figures, or orientational or positional relationships in which the product of the invention is conventionally placed, merely for facilitating describing the present invention and simplifying the description, rather than indicating or suggesting that related devices or elements have to be in the specific orientation or configured and operated in specific orientation, therefore, they should not be construed as limiting the present invention. Additionally, terms "first", "second", "third" and so on are merely used for distinctive description, and should not be understood as indicating or suggesting to have importance in relativity.

Besides, terms "horizontal", "vertical", "overhanging" and so on do not mean that a part needs to be absolutely horizontal or overhanging, but can be slightly inclined. For example, "horizontal" only means that its direction is more horizontal relative to "vertical", but does not mean that this structure must be completely horizontal, rather, it can be slightly oblique. In the description of the present invention, it also should be indicated that unless otherwise expressly specified and defined, terms "arrangement", "installation", "link" and "connection" should be understood widely, for example, it may be a fixed connection, a detachable connection, or an integrated connection; it may be a mechanical connection, or an electrical connection; it may be a direct connection, or an indirect connection through an intermediate medium; and it also may be an inner communication between two elements. For a person ordinarily skilled in the art, the specific meanings of the above-mentioned terms in the present invention can be understood according specific circumstances.

Below, the present invention is described in detail in conjunction with figures.

Referring to a structural explosive view of an electro-mechanical gyro-balanced unicycle 100 of the present invention as shown in FIG. 1, the electro-mechanical gyro-balanced unicycle comprises: a wheel 101, a housing 102, pedals 103, electro-mechanical gyro assemblies 104, a control panel 105, a battery pack 106, a brake light 107, a charging interface 108, a switch 109, a USB interface 110, an illumination lamp 111 and a pull rod 112. The housing 102 is provided outside the wheel 101, two pedals 103 are symmetrically provided at both sides of the housing 102, two electro-mechanical gyro assemblies 104 are respectively provided in the two pedals 103, the control panels 105 and the battery packs 106 are provided in the housing 102, the brake light 107, the charging interface 108, the switch 109, the USB interface 110 and the illumination lamp 111 are provided along a circumference of the housing 102, and are respectively connected with the battery pack 106, and the pull rod 112 is connected with the housing 102.

The wheel 101 comprises a first motor 1011, an inflated tire 1012, a support shaft 1013 and L-shape connectors 1014. The first motor 1011 is internally provided at an axle center of the wheel 101, for driving the wheel 101 to rotate. Preferably, the first motor 1011 is a brushless DC motor. The inflated tire 1012 is nested outside the first motor 1011. The support shaft 1013 extends and protrudes from a surface of the first motor 1011 toward both sides of the wheel 101. The support shaft 1013 is used to support and fix the housing 102 and to mount the pedals 103 at both sides of the housing 102. At the same time, the support shaft 1013 is also a rotation shaft around which the first motor 1011 self-rotates. Two L-shape connectors 1014 are provided at both ends of the support shaft 1013, for connecting and fixing the housing 102 and the pedals 103 to both ends of the support shaft 1013.

The L-shape connector 1014 is composed of two portions: a cuboid vertical arm and a horizontal arm. The vertical arm of the L-shape connector 1014 is provided with a first installation hole, whose shape and size are matched with the shape and the size of the support shaft 1013. Through the first installation holes, the L-shape connectors 1014 are "hung" at both sides of the support shaft 1013. The horizontal arm and the vertical arm of the L-shape connector 1014 are perpendicular, and the length of the horizontal arm is apparently smaller than the length of the vertical arm. An end of the horizontal arm away from the vertical arm is provided with a second installation hole, for connecting the pedal 103. Preferably, the pedal 103 is hinged in the second installation hole. In the installed state, the vertical arms of the L-shape connectors 1014 are parallel to a surface of the first motor 1011 perpendicular to the support shaft 1013, and the horizontal arms protrude and extend outwardly from both sides of the wheel 101.

Figure 2:
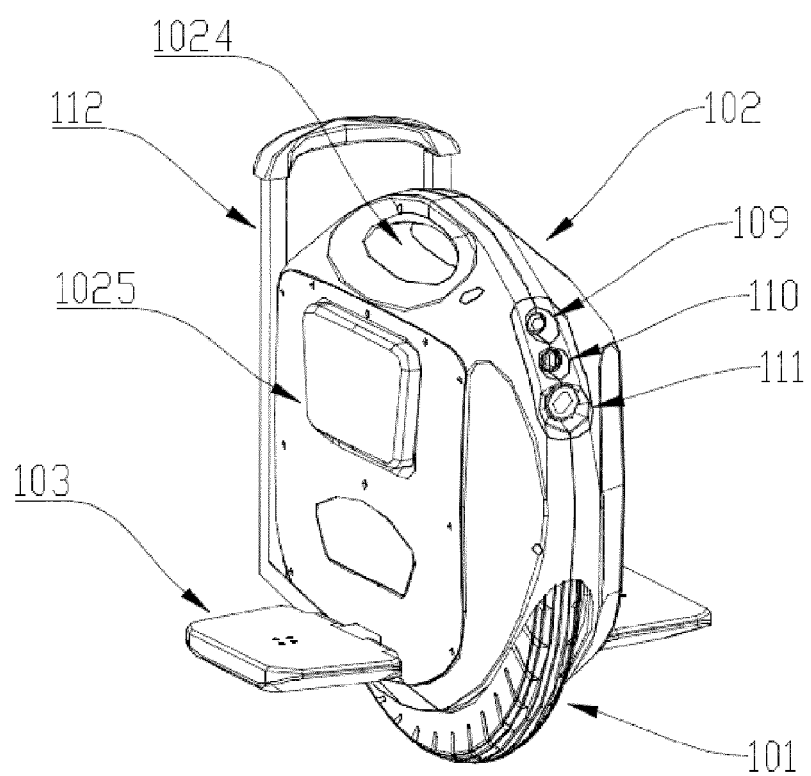
FIG. 2 is a perspective view of the electro-mechanical gyro-balanced unicycle of the present invention.

The housing 102 comprises two symmetrically provided housing halves 1021, and the wheel 101 is received in a first cavity defined by the two housing halves 1021. The first cavity has a space sufficient to receive the wheel 101. The housing 102 is kept in a shape matched with the wheel 101. The shape of the housing 102 is substantially round. In conjunction with FIG. 1 and FIG. 2, parts of the two housing halves 1021 above the wheel 101 are connected with each other, and parts of the two housing halves 1021 below the wheel 101 are not in contact with each other, and form one opening below the wheel, to partially expose the wheel 101 from the housing 102, so as to run on the ground.

Referring to FIG. 1 again, the housing half 1021 comprises a main housing 1022 and a cover plate 1023. The wheel 101 is provided between two main housings 1022, and the cover plate 1023 is provided at one side of the main housing 1022 away from the wheel 101. The battery pack 106 and the control panel 105 are provided in a second cavity defined by the main housing 1022 and the cover plate 1023. The battery pack 106 is used to supply an electrical energy to the control panel 105, the first motor 1011, the second motor 1041, the brake light 107 and the illumination lamp 111 and so on, and can charge mobile devices such as a mobile phone through the USB interface.

The electro-mechanical gyro-balanced unicycle 100 of the present invention separates, through the main housings 1022, the wheel 101 from other assemblies in the housing 102, especially electrical assemblies such as the battery packs 106 and the control panels 105 and so on, making the wheel 101 separately located in an independent cavity, which can prevent wires connecting the battery packs 106 with other assemblies from being wound into the wheel 101 during the process of rotation of the wheel, and also realize separation of a drying area and a moist area inside the housing 102 in a rainy day. It facilitates improving the safety in use of the wheel, and can prolong the service life of the unicycle. Moreover, the main housings 1022 and the cover plates 1023 are mounted layer by layer to both sides of the wheel 101, quite convenient for both assembling and dissembling of the product. The two main housings 1022 are respectively provided at respective top portions with through holes 1024 corresponding to each other. The through holes 1024 are substantially in an elliptical shape, and the through holes 1024 respectively provided on the two main housings 1022 form one elliptical-shape hole, facilitating a user carrying the unicycle when he/she does not need to ride the unicycle.

A leg protective pad 1025 is provided on an outer surface of the cover plate 1023. Preferably, the leg protective pad 1025 is inlaid on the outer surface of the cover plate 1023. Preferably, the leg protective pad 1025 is provided on an upper half portion of the cover plate 1023. The leg protective pad 1025 is made from a PU leather (superfine fiber reinforced leather), for protecting a leg, and providing a certain support force to the leg in the riding process, to reduce the pressure on the leg and improve comfort in the riding process.

The pedals 103 are provided at both sides of the housing 102, and provided at the lower side of the housing 102. The pedal 103, being a hollow pedal, comprises a gyro upper bracket 1031 and a gyro lower bracket 1032. When looked down, the gyro upper bracket 1031 and the gyro lower bracket 1032 maintain matched rectangular shapes or square shapes and identical sizes. The gyro upper bracket 1031 and the gyro lower bracket 1032 are connected and fixed through a buckle structure correspondingly provided at respective outer peripheries. The gyro upper support 1031 comprises a first upper surface for stepping on, the first upper surface being provided along a horizontal direction. Two sides of the first upper surface respectively extend downwardly to form a second upper surface and a third upper surface, and the second upper surface and the third upper surface are parallel to each other. The gyro lower support 1032 comprises a first lower surface corresponding to the first upper surface. Two sides of the first lower surface extend obliquely upward to form a second lower surface and a third lower surface, and the second lower surface and the third lower surface are opposite to each other. In an installed state, the second upper surface and the third upper surface are respectively located between the second lower surface and the third lower surface. A third cavity for receiving the electro-mechanical gyro assembly 104 is defined by the first upper surface, the second upper surface, the third upper surface, the first lower surface, the second lower surface and the third lower surface.

Figure 3:
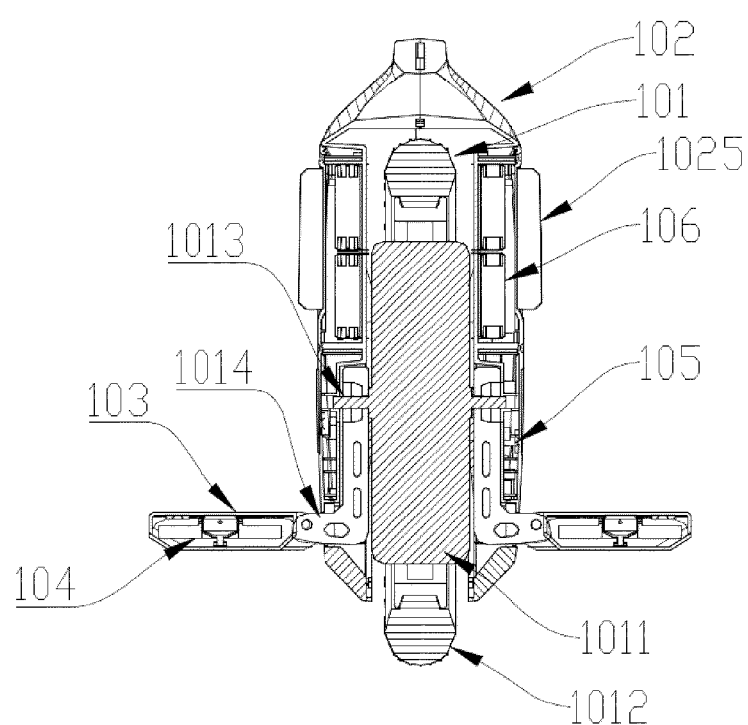
FIG. 3 is a section view of the electro-mechanical gyro-balanced unicycle of the present invention.

In conjunction with FIG. 1 and FIG. 3, the electro-mechanical gyro assembly 104 is provided in the pedal 103. Each pedal 103 is at least provided therein with at least one electro-mechanical gyro assembly 104. A person ordinarily skilled in the art can increase the electro-mechanical gyro assembly 104 according to the practical situation, and after the number of the electro-mechanical gyro assembly 104 is increased, the size of the pedal 103 is also correspondingly increased. The electro-mechanical gyro assembly 104 comprises a second motor 1041 and a rotor 1042 capable of being driven by the second motor 1041 to rotate at a high speed so as to produce torques in a horizontal plane. The rotor 1042 is a disk-shape metal component, and the second motor 1041 is internally embedded at an axle center of the rotor.

A rotation shaft of the second motor 1041 is fixed on the gyro lower support 1032, and when being electrically driven, the second motor 1041 rotates at a high speed, and brings the rotor 1042 connected therewith to rotate at a high speed. The second motor 1041 and the rotor 1042 form a configuration of substantially a toy gyro. The rotor 1042 rotates at a high speed under driving by the second motor 1041, and due to the gyro effect, the rotor 1042 produces torques along various directions in a horizontal plane where it is located during the process of high-speed rotation, so that the vehicle body can be under balanced forces in various directions, further balancing the vehicle body on the whole.

The second motor 1041 and the rotor 1042 are provided in pair in the pedal 103. That is, one rotor 1042 is corresponding to one second motor 1041. Preferably, the second motor 1041 is a high-speed brushless DC motor. The second motor 1041 in the present invention has a small volume, and can have a rotation speed up to 18,000-20,000 r/min. Preferably, the rotor 1042 has a disk-shape structure made from an iron alloy.

The control panel 105 is used to control rotation of the first motor 1011 and the second motor 1041. The control panel 105 is provided in the second cavity defined by the main housing 1022 and the cover plate 1023 and is respectively connected with the first motor 1011 and the second motor 1041.

The control panel 105 is provided with a Bluetooth module and an acceleration sensor (not shown in the figure).

The Bluetooth module is connected with a mobile device (for example, a mobile phone or a remote controller), and sets a gentle riding mode, a comfortable riding mode or a robust riding mode for the electro-mechanical gyro-balanced unicycle 100 according to instructions sent from the mobile device.

The gentle riding mode is a low-speed operation mode, that is, the electro-mechanical gyro-balanced unicycle 100 moves at a low speed, generally below 10 km/h. The gentle riding mode is suitable for circumstances with relatively poor road conditions, for example, roads in a rainy day, roads in congestion, and roads with potholes; furthermore, it is also suitable for crossings with a big crowd, for example, crossroads, school crossings and so on.

The comfortable riding mode is a middle-speed operation mode, that is, the electro-mechanical gyro-balanced unicycle 100 moves at a middle speed, generally within 10-25 km/h. The comfortable riding mode is suitable for general road conditions, in between the gentle riding mode and the robust riding mode.

The robust riding mode is a high-speed operation mode, that is, the electro-mechanical gyro-balanced unicycle 100 moves at a high speed, generally above 25 km/h. However, for the sake of safety, the highest operational speed of the electro-mechanical gyro-balanced unicycle 100 is set to be 40 km/h. The robust riding mode is suitable for circumstances with relative good road conditions, for example, straight roads having few pedestrians and vehicles.

All of the gentle riding mode, the comfortable riding mode and the robust riding mode are automatic operation modes of the electro-mechanical gyro-balanced unicycle 100. When a user does not activate the automatic operation mode, the user still self-controls the vehicle speed of the electro-mechanical gyro-balanced unicycle 100 by adjusting a gravity center of a body in a motion direction, for example, leaning forward or leaning back the body. When the user activates the automatic operation mode, i.e. selects any one of the above-mentioned three modes, the control panel 105 controls the rotation of the first motor 1011, to adjust the vehicle speed to a speed matched with the set mode. When the rotation speed of the first motor 1011 is changed, a positively related change also correspondingly occurs to the second motor 1041. That is, when the rotation speed of the first motor 1011 is increased, the rotation speed of the second motor 1041 is correspondingly increased, and vice versa.

During the operation process, if a current vehicle speed exceeds a predetermined threshold value under the current riding mode, the brake light 107 starts to flash, so as to remind the user of overspeed, and the control panel 105 will control the first motor 1011 to decrease the vehicle speed. This predetermined threshold value also can be set by the user through application software of mobile phones.

The electro-mechanical gyro-balanced unicycle 100 of the present invention also can send data, such as vehicle speed, system temperature, and residual energy of the battery pack 106, to the mobile devices such as mobile phones through the Bluetooth module.

The acceleration sensor is used to detect the operation acceleration of the electro-mechanical gyro-balanced unicycle 100. The acceleration sensor continuously detects the operation acceleration of the electro-mechanical gyro-balanced unicycle 100, and feeds the detected acceleration to the control panel 105. Preferably, a detection cycle of the acceleration sensor is 2 ms.

Figure 4:
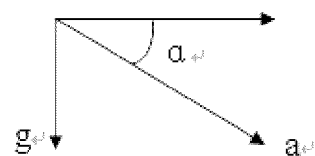
FIG. 4 is a distribution view of forces experienced by the electro-mechanical gyro-balanced unicycle of the present invention during an operation process, wherein since the mass is same, only corresponding acceleration is used for representation in the figure, and in the figure a indicates an oblique angle of an electro-mechanical gyro-balanced scooter, a indicates an acceleration of the electro-mechanical gyro-balanced scooter, and g indicates a gravity acceleration, equal to 9.8 m/s$^2$.

The control panel 105 calculates an oblique angle of the electro-mechanical gyro-balanced unicycle 100 according to the acceleration fed back by the acceleration sensor, and controls a rotation direction of the first motor 1011 according to the oblique angle. Taking an advancing direction of the unicycle as a positive direction, the acceleration detected by the acceleration sensor is divided in the horizontal and vertical directions, as shown in FIG. 4, and is calculated according to an inverse trigonometric function $\alpha=\arcsin(a/g)$, wherein $\alpha$ indicates the oblique angle of the electro-mechanical gyro-balanced unicycle, a indicates the acceleration detected by the acceleration sensor, and g indicates a gravity acceleration, $g=9.8$ m/s$^2$.

When the calculated oblique angle is larger than zero, it indicates that the vehicle body leans forward, and at this time, the control panel 105 controls the first motor 1011 to rotate backward. When the calculated oblique angle is zero, that is, the detected operation acceleration is zero, it indicates that the vehicle body is in a balanced state. When the calculated oblique angle is smaller than zero, it indicates that the vehicle body leans backward, and the control panel 105 controls the first motor 1011 to rotate forward. In the present invention, self-balance of the electro-mechanical gyro-balanced unicycle 100 in the front and back directions is controlled by the control panel 105 and the acceleration sensor.

The battery pack 106 is provided in the second cavity defined by the main housing 1022 and the cover plate 1023. The battery pack 106 is respectively connected with the first motor 1011, the second motor 1041, the control panel 105 and the acceleration sensor and the Bluetooth module on the control panel 105, for supplying electrical energy to them. The battery pack 106 is a storage battery pack having charging and discharging functions.

Preferably, the battery pack 106 uses 16 18650 batteries of which the voltage can reach 53-67.2 V.

The illumination lamp 111 is used to provide illumination for the user when travelling on a low-light road.

Preferably, the illumination lamp 111 is provided therein with a photosensitive sensor. The photosensitive sensor can sense changes of light in an external environment. When the brightness of the acquired light is lower than a predetermined threshold value or higher than the predetermined threshold value, the illumination lamp 111 is automatically turned on or turned off, so that the electro-mechanical gyro-balanced unicycle 100 is more convenient and intelligent.

Below in conjunction with FIG. 4, the working principle of the electro-mechanical gyro-balanced unicycle 100 of the present invention is illustrated.

The user activates the electro-mechanical gyro-balanced unicycle 100 through the switch 109. The control panel 105 controls at least one electro-mechanical gyro assembly 104 provided in the pedal 103 to rotate at a high speed. Due to the gyro effect, the rotor 1042 of the electro-mechanical gyro assembly 104, during the process of high-speed rotation, produces torques along various directions in the horizontal plane where it is located, so that the vehicle body can be under balanced forces in various directions, further balancing the vehicle body on the whole. The acceleration sensor sends the detected acceleration of the electro-mechanical gyro-balanced unicycle 100 to the control panel 105 in a form of pulse signal (PWM), and the control panel 105 calculates the oblique angle of the electro-mechanical gyro-balanced unicycle according to the received pulse signal (PWM) representing the acceleration value and the inverse trigonometric function $\alpha = \arcsin(a/g)$. When the calculated oblique angle is larger than zero, it indicates that the vehicle body leans forward, and at this time, the control panel 105 controls the first motor 1011 to rotate backward. When the calculated oblique angle is zero, that is, the detected operation acceleration is zero, it indicates that the vehicle body is in a balanced state. When the calculated oblique angle is smaller than zero, it indicates that the vehicle body leans backward, and the control panel 105 controls the first motor 1011 to rotate forward. Balance of the electro-mechanical gyro-balanced unicycle 100 in the front and back directions is controlled by adjusting the first motor 1011 to rotate forward or backward.

Preferably, the brake light 107, the charging interface 108, the switch 109, the USB interface 110 and the illumination lamp 111 are successively provided between the two main housings along a circumference of the housing. Taking the through holes 1024 provided at the top portion of the housing 102 as a demarcation point, the brake light 107 and the charging interface 108 are successively provided at a rear side of the through holes 1024 along the circumference of the housing 102, and the switch 109, the USB interface 110 and the illumination lamp 111 are successively provided at the front side of the through holes 1024 along the circumference of the housing 102.

The pull rod 112 is connected below the rear side of the housing 102. The pull rod 112 is a telescoping rod whose length can be telescopically adjusted. The shortest length to which the pull rod 112 is contracted is matched with the height of the wheel.

The above are merely preferable examples of the present invention and not used to limit the present invention. For one skilled in the art, various modifications and changes may be made to the present invention. Without departing from the spirit and principle of the present invention, any modifications, equivalent replacements, improvements and so on should fall within the scope of protection of the present invention.

What is claimed is:

1. An electro-mechanical gyro-balanced unicycle, comprising:
a wheel provided therein with a first motor,
a housing provided outside the wheel, and
hollow pedals respectively provided at both sides of the housing,
wherein each pedal is provided therein with an electro-mechanical gyro assembly, and the electro-mechanical gyro assembly comprises a second motor and a rotor capable of being driven by each second motor to rotate at a high speed so as to produce torques in a horizontal plane.

2. The electro-mechanical gyro-balanced unicycle according to claim 1, wherein each rotor is a disk-shape metal component, and each second motor is internally embedded at an axle center of each rotor.

3. The electro-mechanical gyro-balanced unicycle according to claim 2, wherein the housing comprises a pair of symmetrically provided housing halves, and the wheel is received in a first cavity defined by the pair of housing halves.

4. The electro-mechanical gyro-balanced unicycle according to claim 3, wherein each housing half comprises a main housing and a cover plate provided at one side of a corresponding main housing away from the wheel, and a battery pack and a control panel are provided in a second cavity defined by each cover plate and the corresponding main housing.

5. The electro-mechanical gyro-balanced unicycle according to claim 4, wherein each of the main housings are respectively provided at respective top portions with through holes corresponding to each other.

6. The electro-mechanical gyro-balanced unicycle according to claim 4, wherein a leg protective pad is provided on an outer surface of each cover plate.

7. The electro-mechanical gyro-balanced unicycle according to claim 4, wherein the electro-mechanical gyro-balanced unicycle further comprises a brake light, a charging interface, a switch, a USB interface and an illumination lamp successively provided between each of the main housings along a circumference of the housing.

8. The electro-mechanical gyro-balanced unicycle according to claim 1, wherein the electro-mechanical gyro-balanced unicycle further comprises a pull rod, and the pull rod is connected with the housing.

9. The electro-mechanical gyro-balanced unicycle according to claim 1, wherein the wheel further comprises a support shaft provided at an axle center of the first motor, and the support shaft extends and protrudes from a surface of the first motor toward both sides of the wheel.

10. The electro-mechanical gyro-balanced unicycle according to claim 9, wherein both ends of the support shaft are respectively provided with an L-shape connector, and the L-shape connector connects and fixes the housing and the pedals to both ends of the support shaft.

* * * * *